Figure 1:
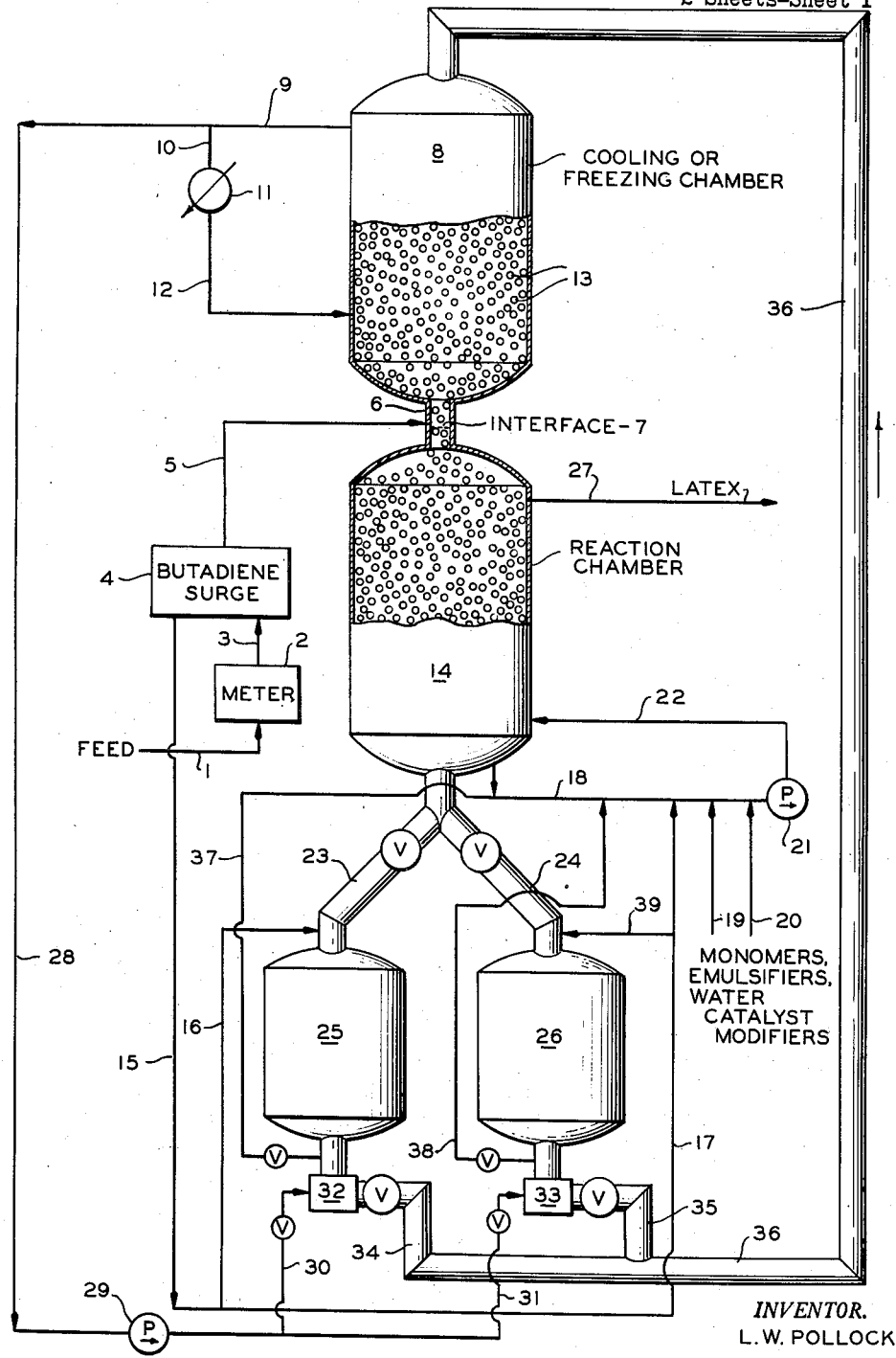

Aug. 5, 1958     L. W. POLLOCK     2,846,421
HIGH HEAT CAPACITY COOLING MEDIUM
Filed Feb. 18, 1954     2 Sheets-Sheet 1

INVENTOR.
L. W. POLLOCK
BY Hudson & Young
ATTORNEYS

INVENTOR.
L. W. POLLOCK
BY Hudson & Young
ATTORNEYS

United States Patent Office 2,846,421
Patented Aug. 5, 1958

2,846,421

HIGH HEAT CAPACITY COOLING MEDIUM

Lyle W. Pollock, Bartlesville, Okla., assignor to Phillips Petroleum Company, a corporation of Delaware Application February 18, 1954, Serial No. 411,115

9 Claims. (Cl. 260—82.3)

This invention relates to a method and apparatus for removing heat in an exothermic liquid phase reaction. In one of its aspects, this invention relates to a system for cooling a polymerization reaction wherein a material having an endothermic phase change at a temperature below the desired reaction temperature and contained in hollow capsules is first cooled below the phase change temperature and the reactants are then contacted by the said capsules.

In recent years a great deal of attention has been given to polymerizing synthetic rubbery materials at low temperatures. My invention is applicable in emulsion polymerization processes which are generally carried out in the temperature range of —40° to +160° F. or higher. Such emulsion polymerizations are well known in the art. In such emulsion polymerizations, the monomeric material, such as a conjugated diene with or without a copolymerizable material, along with water containing an emulsifying agent, activators, oxidants, modifiers and, in the case of those reactions carried out at a temperature less than 32° F., an antifreeze is charged, either batchwise or continuously, to a reaction chamber where polymerization proceeds. The polymerization reaction gives off heat which must be removed in order to maintain the desired low reaction temperature. This invention has been found to be particularly adaptable for controlling the temperature in such emulsion polymerization reactions and for that reason, I will describe my invention in terms of a polymerization reaction.

The polymerizations with which this invention is concerned are those polymerizations wherein polymers are prepared by polymerizing or copolymerizing monomers of the conjugated dienes or their derivatives either alone, with each other, or with other monomers copolymerizable therewith. The conjugated dienes generally employed are preferably those which contain from four to six, inclusive, carbon atoms per molecule, but those containing more carbon atoms per molecule, e. g. eight, can also be used. Such compounds include 1,3-butadiene, isoprene, piperylene, methylpentadiene, 2,3-dimethyl-1,3-butadiene, haloprenes such as chloroprene and the like. Furthermore, various alkoxy, such as methoxy and ethoxy, and cyano derivatives of these conjugated dienes can be employed i. e. 2-methoxybutadiene and 1-cyanobutadiene.

Monomers copolymerizable with conjugated dienes include monomers such as styrene, alph-methylstyrene, other alkylsubstituted styrenes, acrylonitriles, methacrylonitriles, acrylates such as methylacrylate, ethylacrylate, and methyl methacrylate, vinyl chloride, vinylidene chloride, vinyl acetate, methyl vinyl ketone, methyl isopropenyl ketone, methyl vinyl ether, carboxy-containing monomers such as acrylic acid, methacrylic acid, cretonic acid, alpha and beta ethyl-, propyl-, butyl-, amyl-, hexyl-, heptyl-, and octylacrylic acids, phenylacrylic acids and the like, pyridine and quinoline derivatives containing at least one vinyl group such as 2-vinylpyridine, 3-vinylpyridine, 4-vinylpyridine, 2,4,6-trimethyl-5-vinylpyridine, 3,4,5,6-tetramethyl-2-vinylpyridine, 3-ethyl-5-vinylpyridine, 2-methyl-5-vinylpyridine, 2,6-diethyl-4-vinylpyridine, 3-dodecyl-2,4-divinylpyridine, 2,6-diphenyl-3-vinylpyridine, 2,4-divinylpyridine, 6-phenyl-3-vinylpyridine, 2,4-divinylpyridine, 2,3-divinylpyridine, 2,5-divinylpyridine, 2,4-divinyl-5-ethyl quinoline and the like.

The polymerizable conjugated dienes as well as derivatives thereof are well known in the art as are monomers copolymerizable therewith. As has been herein indicated, recipes employing polymerization in emulsion systems at low temperatures are also well known. No further discussion of polymerizable materials or cold polymerization recipes need be made here as my invention is concerned with a method and suitable apparatus for maintaining a low temperature in the polymerization zone.

An object of this invention is to provide a high heat capacity cooling medium for removing heat from an exothermic liquid phase reaction. Another object of this invention is to provide a method and apparatus for maintaining the desired temperature in a polymerization reaction. Other objects and advantages of my invention will be apparent to those skilled in the art upon reading this specification and the attached claims.

In the practice of this invention, hollow capsules or other objects containing therein a material which undergoes an endothermic phase change at a temperature below the desired polymerization temperature are first cooled to a temperature below the solidification temperature of the fusible material. These thus-cooled capsules are introduced into a polymerization zone where they contact an aqueous emulsion of polymerizable monomers. As polymerization proceeds, heat is given off to the cold capsules and as the contained material reaches the phase change temperature, it will continue to absorb heat and at the same time prevent an increase in the reaction temperature. The total heat capacity of the capsules is greatly increased by the changing of the phase by the contained material.

The capsules can be cooled by circulating a cold fluid past the capsules such as brine, alcohol, ammonia, or other refrigerant. However, the usual coolant will be one of the reactants, for example, butadiene.

These capsules can be made from any material which is chemically inert toward the emulsion and coolant at the temperatures involved. For example, the capsules can be conveniently made of a plastic material such as polyethylene or a metal. The material chosen to fill the capsules will be dependent upon the desired operating or polymerization temperature, it being only required that the filling material undergo a phase change below the polymerization temperature. In general, the filling material will undergo a phase change only a few degrees, say up to 25° F., below the desired polymerization temperature. The heat required for warming the capsules and the contained material up to the reaction temperature, is, in general, negligible compared to the heat required for causing the material to undergo its phase change and consequently this heat capacity would have little advantage over ordinary cooling coils or a solid material. The chief advantage of my invention is the comparatively large heat capacity which can be utilized for cooling when these material-containing capsules are used. The material can be selected from a large group of compounds of which those given below along with their phase change temperatures and heats of phase change are representative.

| Material | Temperature of Phase Change (Freezing Point), °F | Heat of Phase Change (Heat of Fusion), B. t. u./lb |
|---|---|---|
| Mercury | −38 | 4.98 |
| Water | 32 | 144.0 |
| Na₂SO₄.10H₂O | 90 | 91.98 |
| Benzene | 40 | 54.18 |
| Wood's Metal* | 140–160 | 19.73 |
| Glycol | | 77.94 |

*An alloy containing 4 parts tin, 8 parts lead, 15 parts bismuth and 4 parts cadmium (weight parts).

In the case of plastic or light weight metal capsules containing a low density material, the capsules will also contain a weighted shot such as a lead shot in order to keep the capsules from floating in the emulsion.

These capsules will generally be spherical in shape, but it will be obvious to those skilled in the art that the capsules can be of any desired shape such as elliptical, oblong, etc.

The two cold rubber recipes which are commonly in use at the present time are first a recipe carried out a few degrees under the freezing temperature or in the range of 10 to 20° F. and most frequently at 14° F. and secondly at a temperature a few degrees above the freezing temperature or at a temperature in the range of 35 to 45° F. and most frequently at 41° F. In the case of 14° F. recipe, glycol is a suitable filling material and in the case of a 41° F. recipe, water is a suitable filling material.

Figure 2:
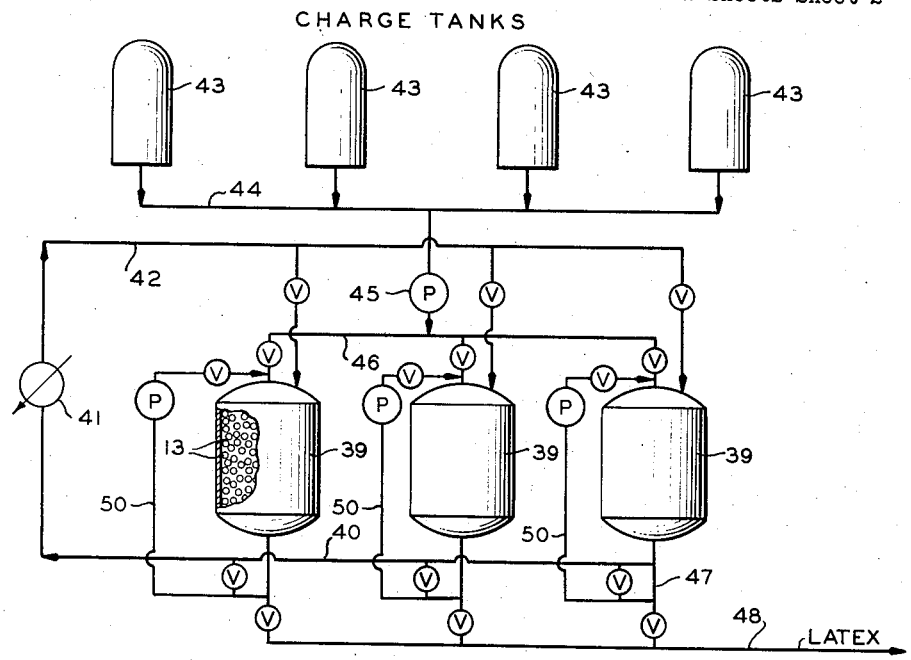
Figure 3:
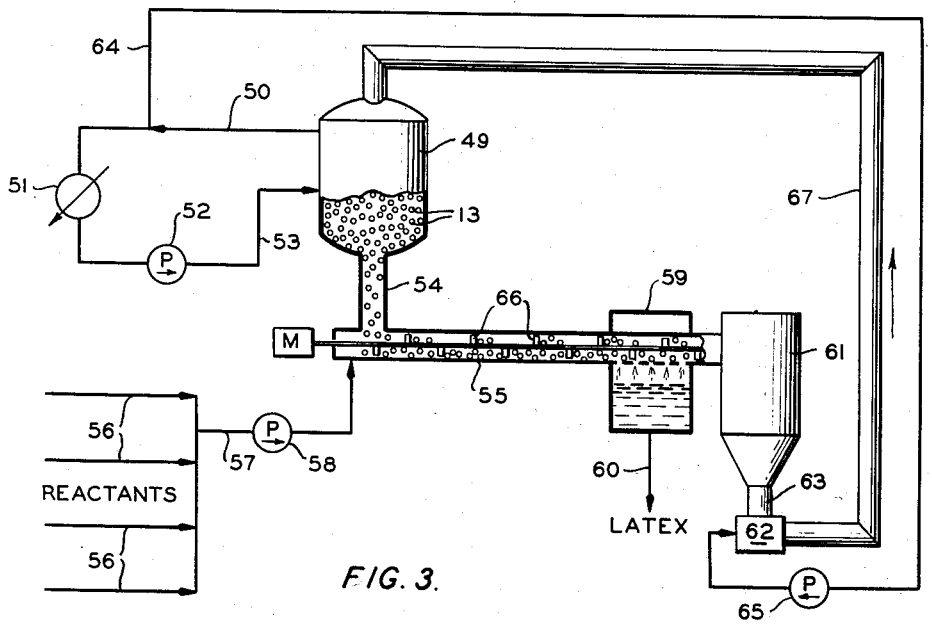

I will further describe my invention using as an example the production of a butadiene-styrene (GR-S type) rubber at 41° F. wherein lead weighted polyethylene spheres containing water are used as the cooling media. I will also refer to the attached drawings of which:

Figure 1 shows schematically an embodiment of my invention wherein one of the reactants is used as the coolant and the cold capsules are gravitated through the reaction chamber. The capsules are returned to the cooling zone by means of a liquid jet lift;

Figure 2 shows schematically an embodiment of my invention wherein the capsules are in a fixed bed and the chamber is cyclically operated by first cooling the capsules and then charging the chamber with the reactants; and Fig. 3 shows schematically an embodiment of my invention wherein the capsules are cooled, passed through a tubular reactor, and returned to the cooling zone by a jet lift. The coolant can be a material other than a reactant.

Referring to Figure 1, butadiene from feed conduit 1 is measured by meter 2 and passed via conduit 3 to surge tank 4. Part of the butadiene passes via conduit 5 to conduit 6 where it enters the system at or near the point of interface 7 between butadiene and emulsion. The butadiene, being lighter than the emulsion, rises to cooling chamber 8. Butadiene from chamber 8 circulates via conduits 9 and 10 to cooler 11 where the temperature is lowered to less than 32° F. and is returned to the chamber 8 via conduit 12 where it contacts polyethylene spheres 13 which contain water. The cold butadiene freezes the water in the spheres. The cold spheres containing ice gravitate via conduit 6 to reaction chamber 14.

Additional butadiene from surge tank 4 passes via conduit 15 to conduits 16 and 17. Part of the butadiene from conduit 17 passes to header conduit 18. At the same time styrene, emulsifying agent, water, catalyst, modifier and any other desired ingredients are being charged to header 18 via conduits 19 and 20. These materials pass to pump 21 wherein the pumping action forms an emulsion of the ingredients and pumps the resulting emulsion to the reaction chamber 14 via conduit 22 where the emulsion and the ice containing spheres are contacted. As polymerization proceeds, heat is given up to the spheres causing the ice to melt. The latex formed in this reaction chamber is removed via conduit 27.

The spheres from reaction chamber 14 gravitate via conduits 23 and 24 to collection chambers 25 and 26 respectively. The two collection chambers 25 and 26 are used alternately.

When one of the chambers becomes full of spheres its associated valve is closed and the spheres are washed free of emulsion by admitting butadiene from conduit 15 to the top of the collection chamber 25 or 26 as the case may be via conduits 16 or 17 and 39. The butadiene flows past the spheres washing them free of emulsion and the emulsion containing butadiene is returned to the system in conduit 18 via conduits 37 or 38 as the case may be.

Cold butadiene from cooling chamber 8 passes via conduits 9 and 28 to pump 29 where it is pumped via conduits 30 and 31 to jets 32 and 33. When one of the collection chambers 25 or 26 is filled with spheres and washed free of emulsion it is opened to its associated jet 32 or 33 and the liquid butadiene picks up the spheres and returns them to the cooling chamber 8 via conduits 34 or 35 and conduit 36.

Referring to Figure 2, this modification is primarily designed for batch operation. The endothermic phase change material containing capsules 13 are in fixed beds in reactors 39. These reactors are so operated that while the capsules are being cooled in one reactor, polymerization is going on in a second reactor and the third reactor is being emptied.

In the operation of the embodiment of Figure 2, a coolant which can be butadiene is pumped from the reactor via conduit 40 to cooler 41 and is returned to the reactor. This is continued until the water or other material in the spheres is frozen. The coolant is then pumped to a reactor previously emptied of latex. After the spheres are frozen and the coolant removed, the recipe ingredients from charge tanks 43 are charged via conduit 44, pump 45 and conduit 46 to the reactor where polymerization proceeds. As polymerization proceeds, heat is given up to the spheres causing the ice to melt. At the end of the polymerization period, the resulting latex is discharged via conduits 47 and 48 and the reactor is then ready for the coolant from another reactor vessel. Conduit 50 is provided for circulation of reactants if desired.

Referring to Figure 3, the phase change material (water) in spheres 13 is frozen in chamber 49 by circulating a coolant from vessel 49 via conduit 50 to cooler 51 and back to the vessel 49 via pump 52 and conduit 53. The coolant can be butadiene or other material having a density lower than that of the emulsion. The difference in density will cause the coolant to remain in the vessel 49 forming an interface in conduit 54. The ice containing spheres will gravitate via conduit 54 to tubular reactor 55 which is being charged with the recipe ingredients from charge conduit 56 via conduit 57 and emulsifying pump 58. As the spheres and emulsion move along the reactor the agitators 66 continually stir the material and polymerization takes place giving up heat to the spheres causing the ice to melt. The resulting latex is separated from the spheres in zone 59 and is discharged via conduit 60. The spheres are collected in collection zone 61 from which they pass to jet 62 via conduit 63. Part of the coolant from conduit 50 passes via conduit 64 to pump 65 and on to jet 62 where the spheres are picked up and returned to the cooling vessel 49 via conduit 67.

*Example*

To further illustrate my invention calculations are made to show the heat transfer and volume of spheres required in producing 41° F. GR-S rubber where ¼″ diameter polyethylene spheres of 0.012″ wall thickness each containing water and a lead shot are used.

The free volume in a bed of spheres is approximately 33 percent, therefore one cubic foot of reactor volume contains:

0.33 ft.³ emulsion
0.67 ft.³ spheres

The heat of polymerization for 0.33 ft.³ emulsion is 3000 B. t. u. Now with a reaction time of 20 minutes, the total heat removed per cubic foot of vessel per hour is $$3000 \times \frac{60}{20} = 9000 \text{ B. t. u.}$$

which is equivalent to the heat to be removed from 1 ft.³ of emulsion. Each sphere will be about ¾ full of water and therefore a cubic foot of balls (.67 ft.³ of vessel) will contain 30 pounds of water. The heat of fusion will therefore be 30×144=4320 B. t. u./ft. of balls and $$\frac{9000}{4320} = 2 \text{ ft.}^3 \text{ balls/ft.}^3 \text{ reactor vessel/hr.}$$

From the above, it is seen that for each volume of emulsion, two volumes of spheres or balls is required.

I have illustrated my invention in several of its embodiments. Those skilled in the art will see many modifications which can be made without departing from the scope of my invention. For example, I have illustrated the use of this invention in emulsion polymerization. It will be obvious to those skilled in the art, that this invention is equally applicable for cooling any exothermic liquid phase reaction.

I claim:

1. The improvement in controlling the temperature in a liquid phase exothermic reaction which comprises controlling the reaction temperature by contacting the reactants with a plurality of capsules containing therein a material which undergoes an endothermic phase change, the said material being cooled below the phase change temperature, the said temperature being below the temperature of the reaction and the said capsules having a density greater than the reactants and said material contained in said capsules undergoing said phase change thereby absorbing heat given off by said exothermic reaction.

2. An emulsion polymerization process which comprises contacting a plurality of capsules containing a material which undergoes an endothermic phase change with a liquid coolant, reducing the temperature of the contained material below the phase change temperature therein with said coolant, contacting the thus chilled capsules with the polymerization reactants in aqueous emulsion at a temperature greater than the temperature of the phase change of the material, polymerizing monomeric material in the reactants and thereby giving up heat and causing the material to undergo the phase change, separating the resulting latex from the capsules, and recontacting the capsules with the coolant.

3. The process of claim 2 wherein the coolant is of the same material as one of the polymerization ingredients and the phase change temperature of the contained material is not more than 25° F. less than the polymerization temperature.

4. The process of claim 2 wherein the phase change material is water, the contacting temperature of the capsules and polymerization reactants is in the range of 35 to 45° F. and the monomeric materials comprise butadiene and styrene.

5. A process for polymerizing monomeric materials in aqueous emulsion, the said process comprising contacting in a cooling zone plurality of spheres containing therein a material which undergoes a reversible exothermic phase change with a coolant and thereby reducing the temperature of the material below the phase change temperature, the said spheres having a density greater than the emulsion; continually passing spheres containing cooled material from the cooling zone to a reaction zone; continually introducing polymerization reactants including monomeric material in aqueous emulsion into the reaction zone; polymerizing the monomeric material at a temperature higher than the phase change point of the contained material; absorbing heat of polymerization by causing the material to undergo an endothermic phase change; continually withdrawing resulting latex from the reaction zone; continually withdrawing spheres from the reaction zone; and continually returning the last withdrawn spheres to the cooling zone.

6. The process of claim 5 wherein the coolant is the same material as is one of the polymerization reactants.

7. The process of claim 6 wherein the contained material is water, the monomeric material is polymerized at a temperature in the range of 35 to 45° F. and the monomeric material comprises butadiene and styrene.

8. The process of claim 6 wherein the polymerization temperature is in the range of −40 to +160° F.

9. The process of claim 6 wherein the polymerization temperature is in the range of 10 to 20° F.

References Cited in the file of this patent

UNITED STATES PATENTS

| | | |
|---|---|---|
| 1,614,387 | Pereda | Jan. 11, 1927 |
| 2,244,612 | Crowley | June 3, 1941 |
| 2,475,016 | De Nie | July 5, 1949 |
| 2,560,469 | Ogorzaly | July 10, 1951 |
| 2,571,342 | Crowley | Oct. 16, 1951 |